(12) United States Patent
Huang et al.

(10) Patent No.: US 10,626,970 B2
(45) Date of Patent: Apr. 21, 2020

(54) MULTI-MODE TRANSMISSION INCLUDING A CONTINUOUSLY VARIABLE TRANSMISSION

(71) Applicant: GM GLOBAL TECHNOLOGY OPERATIONS LLC, Detroit, MI (US)

(72) Inventors: Ying Huang, Shanghai (CN); Farzad Samie, Franklin, MI (US); Chengwu Duan, Shanghai (CN); Jian Yao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/079,858

(22) PCT Filed: Apr. 11, 2016

(86) PCT No.: PCT/CN2016/078952
§ 371 (c)(1),
(2) Date: Aug. 24, 2018

(87) PCT Pub. No.: WO2017/177359
PCT Pub. Date: Oct. 19, 2017

(65) Prior Publication Data
US 2019/0093744 A1   Mar. 28, 2019

(51) Int. Cl.
*F16H 37/08* (2006.01)
*F16H 3/72* (2006.01)
*F16H 9/18* (2006.01)

(52) U.S. Cl.
CPC ......... *F16H 37/0846* (2013.01); *F16H 3/724* (2013.01); *F16H 9/18* (2013.01); *F16H 2037/0886* (2013.01)

(58) Field of Classification Search
None
See application file for complete search history.

(56) References Cited

U.S. PATENT DOCUMENTS 5,916,053 A   6/1999   McCarrick et al.
5,980,414 A * 11/1999   Larkin ................ F16H 37/0846
                                              475/211

(Continued)

FOREIGN PATENT DOCUMENTS

CN   102758896 A   10/2012
JP   H116554 A    1/1999

OTHER PUBLICATIONS

International Search Report and Written Opinion issued in International Application No. PCT/CN2016/078952 dated Apr. 11, 2016.

*Primary Examiner* — Justin Holmes
(74) *Attorney, Agent, or Firm* — Quinn IP Law

(57) ABSTRACT

A transmission includes a continuously variable unit (CVU) (20) arranged in parallel with an expansion gearset (120). The CVU (20) includes a first pulley (22) that is rotatably coupled to a second pulley (24) and an input member (12). The expansion gearset (120) includes a planetary gearset (130) that is arranged in series with a coplanar second gearset (140), and the second gearset (140) includes a first gear (142) engaged with a layshaft gear (144). The second pulley (24) is rotatably couplable to the first gear (142) of the second gearset (140). The layshaft gear (144) is engaged with a ring gear (136) and a carrier member (134) which is rotatably couplable to an output member (14). The first pulley (22) is rotatably couplable to the sun gear (132) via a first clutch (115). The transmission operates in a continuously variable mode when the first clutch (115) is deactivated, and operates in a power split mode when the first clutch (115) is activated.

18 Claims, 2 Drawing Sheets

(56) References Cited

U.S. PATENT DOCUMENTS

| | | | |
|---|---|---|---|
| 6,036,616 A * | 3/2000 | McCarrick | F16H 37/022 475/206 |
| 6,348,021 B1 * | 2/2002 | Lemanski | F16H 3/70 475/164 |
| 2002/0094911 A1 | 7/2002 | Haka | |
| 2008/0171626 A1 | 7/2008 | Pollman | |
| 2009/0250278 A1 | 10/2009 | Kawasaki et al. | |
| 2011/0009225 A1 * | 1/2011 | Husson | F01P 5/04 475/210 |
| 2016/0131256 A1 * | 5/2016 | Toyoda | F16H 37/022 701/51 |
| 2017/0037946 A1 * | 2/2017 | Kao | F16H 37/022 |

* cited by examiner

MULTI-MODE TRANSMISSION INCLUDING A CONTINUOUSLY VARIABLE TRANSMISSION

TECHNICAL FIELD

This disclosure relates to a powertrain system including a multi-mode transmission that includes a continuously variable transmission.

BACKGROUND

Powertrains may include a prime mover, such as an internal combustion engine that is coupled to a transmission device that includes a continuously or infinitely variable transmission (CVT) to provide tractive effort in vehicles. A characteristic of a CVT includes the capability to continuously change a speed ratio between a minimum input speed/output speed (i.e., overdrive) ratio and a maximum input speed/output speed (i.e., underdrive) ratio, thus permitting selection of engine operating points that achieve peak efficiency, e.g., a mean-best torque point, in response to an operator torque request. A continuously variable transmission is capable of steplessly changing and operating at an infinite number of effective gear ratios over a range between a maximum gear ratio and a minimum gear ratio. Variators or continuously variable units (CVU) may be characterized in terms of a speed ratio spread, which is a numerical ratio having a value that is calculated based upon the minimum input speed/output speed (overdrive) ratio and the maximum input speed/output speed (underdrive) ratio. It may be advantageous to increase the speed ratio spread in a transmission that employs a CVU.

SUMMARY

A torque transmission device for transferring mechanical power between a transmission input member and a transmission output member is described, and includes a continuously variable unit (CVU) arranged in parallel with an expansion gearset. The CVU includes a first pulley that is rotatably coupled to a second pulley, wherein the first pulley is rotatably coupled to the transmission input member. The expansion gearset includes a planetary gearset that is arranged in series with a coplanar second gearset, and the second gearset includes a first gear meshingly engaged with a layshaft gear. The second pulley is rotatably couplable to the first gear of the second gearset. The planetary gearset includes a sun gear meshingly engaged with planet gears and a carrier member meshingly engaged with a ring gear, including the layshaft gear meshingly engaged with the ring gear and the carrier member rotatably couplable to the transmission output member. The first pulley is rotatably couplable to the sun gear via activation of a first clutch. The torque transmission device operates in a continuously variable mode to transfer power between the transmission input member and the transmission output member when the first clutch is deactivated, and operates in a power split mode to transfer power between the transmission input member and the transmission output member when the first clutch is activated.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
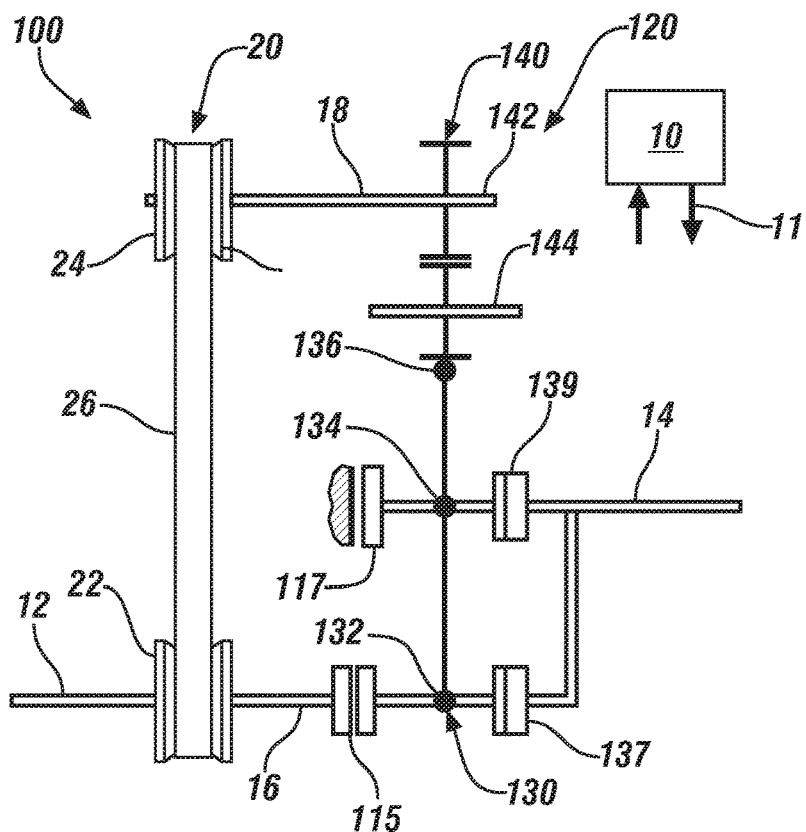
FIG. 1 schematically shows a first embodiment of a multi-mode transmission that includes a continuously variable unit (CVU) arranged in parallel with a first expansion gearset that includes a planetary gearset that is arranged in series with a coplanar second gearset between a transmission input member and a transmission output member, in accordance with the disclosure.

Referring now to the drawings, wherein the depictions are for the purpose of illustrating certain exemplary embodiments only and not for the purpose of limiting the same, FIGS. 1, 2, 3 and 4 each schematically illustrate pertinent elements of a multi-mode torque transmission device (multi-mode transmission) that employs an embodiment of a continuously variable unit (CVU) 20 of a continuously or infinitely variable transmission (CVT) that is arranged to rotate in parallel with one or more gearsets between a transmission input member 12 and a transmission output member 14. The CVU 20 is preferably arranged to rotate in parallel with the gearsets to transfer mechanical power in the form of torque and rotating speed between the transmission input member 12 and the transmission output member 14 in either a CVT mode or a power-split mode. In one embodiment, the transmission input member 12 couples to a torque-generative device or a prime mover such as an internal combustion engine or an electric machine. In one embodiment, the transmission output member 14 couples to a driveline to transfer torque to tractive wheels of a vehicle. The vehicle may include, by way of non-limiting examples, a passenger vehicle, a light-duty or heavy-duty truck, a utility vehicle, an agricultural vehicle, an industrial/warehouse vehicle, or a recreational off-road vehicle. Alternatively, the transmission output member 14 may couple to a driveline to transfer torque to a propeller of a rotary wing aircraft, such as a helicopter.

In each of the embodiments, the arrangement of the CVU 20 in parallel with one or more gearsets facilitates an expansion of the CVU speed ratio spread. Such arrangements allow branched power at overdrive ratios to increase efficiency by reducing baseline CVT load. A reduced baseline CVT power at overdrive ratios may lead to increased transmission efficiency. Furthermore the expanded CVT ratio spread facilitates use of a smaller CVU to produce the same ratio spread. The hardware configurations described herein facilitate expansion of a CVT ratio spread as compared to the CVU 20 alone.

Operations of various controllable elements of the multi-mode transmission are controlled by a controller 10. Each of the embodiments of the multi-mode transmission described herein is capable of transferring torque between the transmission input member 12 and the transmission output member 14 in either a continuously variable mode or a power-split mode through the CVU 20 and the associated gearset. As used herein, the term "selectively" is employed to describe any controller-controllable operating state, including activation and deactivation of one or a plurality of clutches. A "clutch" can be any selectively activatable and deactivatable torque transfer device that employs friction, mechanical interference or another suitable force to couple devices, including rotatably coupling coaxial devices.

FIG. 1 schematically shows a first embodiment of a multi-mode transmission 100 that includes the CVU 20 arranged in parallel with a first expansion gearset 120 that includes a planetary gearset 130 that is arranged in series with a coplanar second gearset 140 between a transmission input member 12 and a transmission output member 14. The CVU 20 includes a first pulley 22 that is rotatably coupled to a second pulley 24 via a continuous flexible member 26. The first pulley 22 is rotatably coupled to the transmission input member 12 and a CVT input member 16, and the second pulley 24 is rotatable coupled to a CVT output member 18. The planetary gearset 130 includes a sun gear 132, planet gears and carrier member 134, and a ring gear 136, all of which are meshingly engaged. The coplanar second gearset 140 includes a first gear 142 that is meshingly engaged to a second gear 144, wherein the second gear 144 is a layshaft gear that meshingly engages the ring gear 136 of the planetary gearset 130. A plurality of clutches, including first clutch C1 115, brake CB1 117, clutch SN1 137 and clutch SN2 139, are arranged to selectively engage various rotating members that are coupled to elements of the first expansion gearset 120 and the CVU 20 to effect transmission operation in one of a plurality of transmission range states including Park, Reverse, Neutral and Drive in response to commands from the controller 10, as described with reference to Table 1. The aforementioned clutches may also be nominally referred to as follows: first clutch C1 115, second clutch CB1 117, third clutch SN1 137 and fourth clutch SN2 139.

In one embodiment, clutches SN1 137 and SN2 139 are dog clutches that include meshing elements that selectively engage to effect rotation and torque transfer. Alternatively, either or both clutches SN1 137 and SN2 139 may be selectable one-way clutches or another clutch device that mates meshable elements. A dog clutch is an intermeshing clutch that is able to couple rotation and torque transfer between two members by meshing complementary splines of respective elements of the two members when their rotational speeds are synchronized, as is known by those skilled in the art. Dog clutches and similar devices and related elements and control routines such as synchronizers are known to those skilled in the art. Preferably, clutches SN1 137 and SN2 139 are not friction clutches so as to minimize space requirements and control complexity. In one embodiment, clutch C1 115 and brake CB1 117 may be friction clutches, or alternatively, other suitable clutch configurations.

The arrangement of the CVU 20, planetary gearset 130 and coplanar second gearset 140 is as follows in this embodiment. The CVT output member 18 is rotatably coupled to the first gear of the coplanar second gearset 140, and the second gear 144 is meshingly engaged with the ring gear 136 of the planetary gearset 130. The CVT input member 16 is rotatably couplable to the sun gear 132 of the planetary gearset 130 via activation of clutch C1 115. The sun gear 132 of the planetary gearset 130 is rotatably couplable to the transmission output member 14 by activation of clutch SN1 137. The planet gears and carrier member 134 are rotationally grounded to a transmission case by activation of brake CB1 117, and are rotatable couplable to the output member 14 by activation of clutch SN2 139.

The CVU 20 may employ a belt-driven variator, or alternatively, a toroidal variator or another suitable variator configuration. Belt-driven variators and toroidal variators are known and not described in detail herein. By way of a non-limiting embodiment, and as illustrated, the CVU 20 may employ a belt-driven variator that includes the first pulley 22 rotatably coupled to the second pulley 24 via a flexible continuous belt 26 that transfers torque therebetween. In one embodiment, a hydraulic pump fluidly couples to elements of the CVU 20 to supply pressurized hydraulic fluid via a hydraulic circuit in response to control signals that are communicated from the controller 10. Other elements of the CVU 20 are known and thus not described in detail herein.

The first pulley 22, transmission input member 12 and CVT input member 16 rotate about a first axis, and the second pulley 24 and CVT output member 18 rotate about a second axis that is preferably parallel to the first axis. The belt 26 may be a belt, a chain, or another suitable flexible continuous device. An input speed sensor may be arranged to monitor rotation of the transmission input member 12 to generate a variator input speed that relates to a speed of the first pulley 22, and an output speed sensor may be mounted near the CVT output member 18 to generate a variator output speed that relates to a speed of the second pulley 24. One of the first and second pulleys 22, 24 acts as a ratioing pulley to establish a speed ratio and the other of the first and second pulleys 22, 24 acts as a clamping pulley to generate sufficient clamping force to transfer torque therebetween. As used herein, the term 'speed ratio' refers to a variator speed ratio, which is a ratio of the variator output speed and the variator input speed. An underdrive speed ratio occurs when rotational speed of the variator output speed is less than the rotational speed of the variator input speed, and an overdrive speed ratio occurs when rotational speed of the variator output speed is greater than the rotational speed of the variator input speed.

In certain embodiments, each of the first and second pulleys 22, 24 may be split perpendicular to its axis of rotation to define an annular first groove that is formed between a moveable sheave and a stationary sheave. The moveable sheave axially moves or translates along the axis of rotation relative to the stationary sheave. The stationary first sheave is disposed opposite the moveable first sheave. The moveable first sheave and the stationary first sheave each include a first groove surface. The first groove surfaces of the moveable first sheave and the stationary first sheave are disposed opposite each other to define an annular groove therebetween. The opposed grooved surfaces preferably form an inverted frustoconical shape such that a movement of the moveable sheave towards the stationary sheave increases an outer pulley diameter of the annular first groove. An actuator is arranged with the pulley to control an axial position of the moveable sheave in response to a drive signal, including urging the moveable sheave towards the stationary sheave. In one embodiment, the actuator is a hydraulically-controlled device, e.g., a valve that fluidly couples to the hydraulic circuit and the drive signal is a hydraulic pressure signal. Other elements, such as clutch assemblies in the form of selectable one-way clutches and the like may be deployed between the CVU 20 and other powertrain and driveline components and systems.

Gear ratios of the elements of the coplanar second gearset 140 and the planetary gearset 130 may be selected during development, and are based upon device and application-specific criteria.

Clutch activation to effect operation in various transmission range states including Park, Reverse, Neutral, Drive-CVT mode and Drive-Power Split mode, is shown with reference to Table 1, below, wherein clutch activation is indicated by 'X'.

TABLE 1

| Range State | C1 | CB1 | SN1 | SN2 |
|---|---|---|---|---|
| Park | | | X | X |
| Reverse | | X | X | |
| Neutral | | | X | X |
| Drive—CVT Mode | | | X | X |
| Drive—Power Split | X | | | X |

By way of a non-limiting example, the CVU 20 may have a speed ratio that is continuously variable between 0.38:1 and 2.61:1, which thus yields a first speed ratio spread of 6.86 (6.86=2.61/0.38). The planetary gearset 130 may have a gear ratio of 2.9, which in combination with the coplanar second gearset 140 provides a two-stage fixed gear ratio of 5.1:1. As such, the speed ratio spread may be increased to a value of 8.51. When operating in the power-split drive mode, the CVT may experience a reduction in load that ranges from 18% to 60% as the CVT ratio changes from a ratio of 3.2:1 to a ratio of 1.56:1. Thus, the CVU 20 alone is operative at a first speed ratio spread, and when the CVU 20 is arranged in parallel with the expansion gearset 120 including the planetary gearset 130 in series with the coplanar second gearset 140, the combination is operative at a second speed ratio spread that is greater than the first speed ratio spread.

Figure 2:
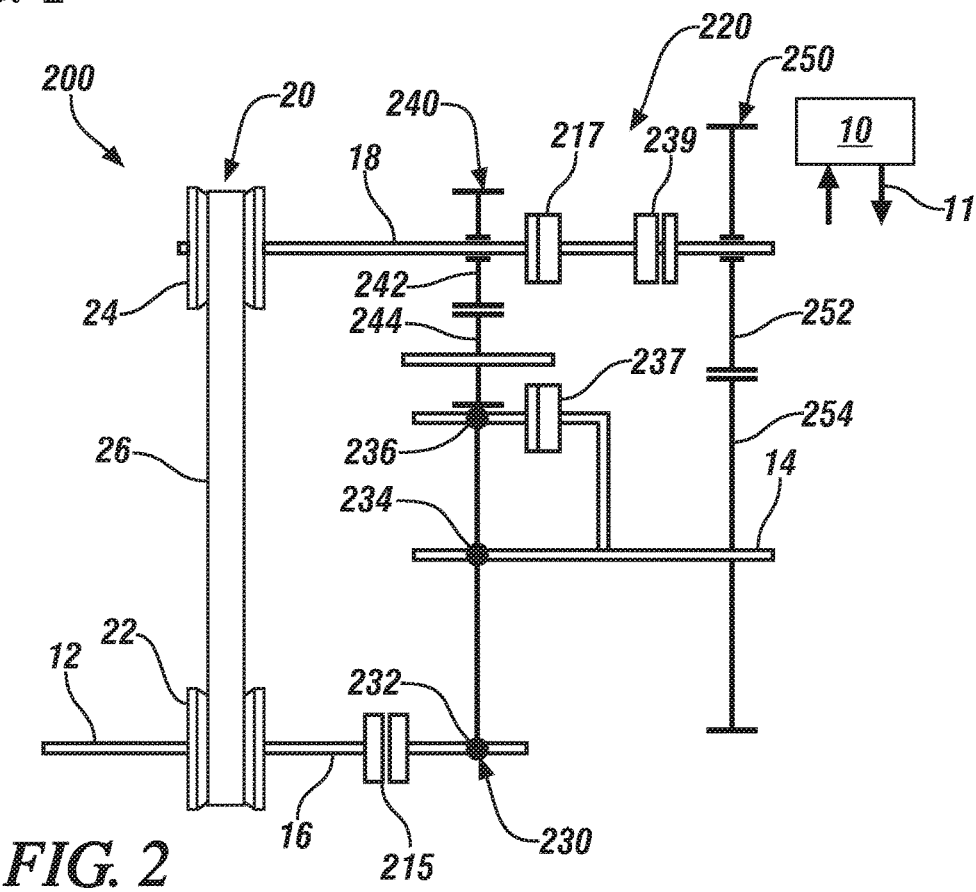
FIG. 2 schematically shows a second embodiment of a multi-mode transmission that includes the CVU arranged in parallel with a first expansion gearset that includes a planetary gearset that is arranged in series with a coplanar second gearset and a second gearset to transfer mechanical power between the transmission input member and the transmission output member, in accordance with the disclosure.

FIG. 2 schematically shows a second embodiment of a multi-mode transmission 200 that includes the CVU 20 arranged in parallel with a first expansion gearset 220 that includes a planetary gearset 230 that is arranged in series with a coplanar second gearset 240 and a third gearset 250 to transfer mechanical power between the transmission input member 12 and the transmission output member 14. The CVU 20 is described herein, and includes a first pulley 22 that is rotatably coupled to a second pulley 24 via a continuous flexible member 26. The first pulley 22 is rotatably coupled to the transmission input member 12 and the CVT input member 16, and the second pulley 24 is rotatable coupled to the CVT output member 18. The planetary gearset 230 includes a sun gear 232, planet gears and carrier member 234, and a ring gear 236, all of which are meshingly engaged. The coplanar second gearset 240 includes a first gear 242 that is meshingly engaged to a second gear 244, wherein the second gear 244 is a layshaft gear that meshingly engages the ring gear 236 of the planetary gearset 230. The third gearset 250 includes a third gear 252 that is meshingly engaged to a fourth gear 254.

A plurality of clutches, including clutch C1 215, clutch SN3 217, clutch SN1 237 and clutch SN2 239, are arranged to selectively engage various rotating members that are coupled to elements of the first expansion gearset 220 and the CVU 20 to effect transmission operation in one of a plurality of transmission range states including Park, Reverse, Neutral and Drive in response to commands from the controller 10, as described with reference to Table 2. The aforementioned clutches may also be nominally referred to as follows: first clutch C1 215, second clutch SN3 217, third clutch SN1 237 and fourth clutch SN2 239.

In one embodiment, clutches SN1 237, SN2 239 and SN3 217 are dog clutches that include meshing elements that selectively engage to effect rotation and torque transfer. Alternatively, any of the clutches SN1 237, SN2 239 and SN3 217 may be selectable one-way clutches or another clutch device that mates meshable elements. Preferably, clutches SN1 237, SN2 239 and SN3 217 are not friction clutches so as to minimize space requirements and control complexity. In one embodiment, clutch C1 215 may be a friction clutch, or alternatively, another suitable clutch configuration.

The arrangement of the CVU 20, planetary gearset 230, coplanar second gearset 240 and third gearset 250 is as follows in this embodiment. The CVT output member 18 is rotatably couplable to the first gear of the coplanar second gearset 240 by activation of clutch SN3 217, and is rotatably couplable to the third gear 252 of the third gearset 250 by activation of clutch SN2 239. The second gear 244 is a layshaft gear that is meshingly engaged with the ring gear 236 of the planetary gearset 230. The CVT input member 16 is rotatably couplable to the sun gear 232 of the planetary gearset 230 via activation of clutch C1 215. The carrier gear 234 of the planetary gearset 230 is rotatably coupled to the transmission output member 14, and the ring gear 236 is rotatably couplable to the transmission output member 14 by activation of clutch SN1 237. The fourth gear 254 of the third gearset 250 is rotatably coupled to the transmission output member 14. The CVU 20 may employ a belt-driven variator, or alternatively, a toroidal variator or another suitable variator configuration. Gear ratios of the elements of the coplanar second gearset 240, the planetary gearset 230 and the third gearset 250 may be selected during development, and are based upon device and application-specific criteria.

Clutch activation to effect operation in various transmission range states including Park, Reverse, Neutral, Drive-CVT mode and Drive-Power Split mode for this embodiment is shown with reference to Table 2, below, wherein clutch activation is indicated by 'X'.

TABLE 2

| Range State | C1 | SN1 | SN2 | SN3 |
|---|---|---|---|---|
| Park | | X | X | |
| Reverse | | X | X | |
| Neutral | | X | | X |
| Drive—CVT Mode | | X | | X |
| Drive—Power Split | X | | | X |

By way of a non-limiting example, the CVU 20 may have a speed ratio that is variable between 0.38:1 and 2.61:1, which thus yields a first speed ratio spread of 6.86

(6.86=2.61/0.38). The planetary gearset 230 may have a gear ratio of 2.9, which in combination with the coplanar second gearset 240 provides a two-stage fixed gear ratio of 5.1:1. As such, the speed ratio spread may be increased to a value of 8.51. When operating in the power-split drive mode, the CVT may have experience a reduction in load that ranges from 18% to 60% as the CVT ratio changes from a ratio of 3.2 to a ratio of 1.56. Thus, the CVU 20 alone is operative at a first speed ratio spread. When the CVU 20 is arranged in parallel with the expansion gearset 220 including the planetary gearset 230 arranged in series with the coplanar second gearset 240 and in parallel with the third gearset 240, the combination is operative at a second speed ratio spread that is greater than the first speed ratio spread.

Figure 3:
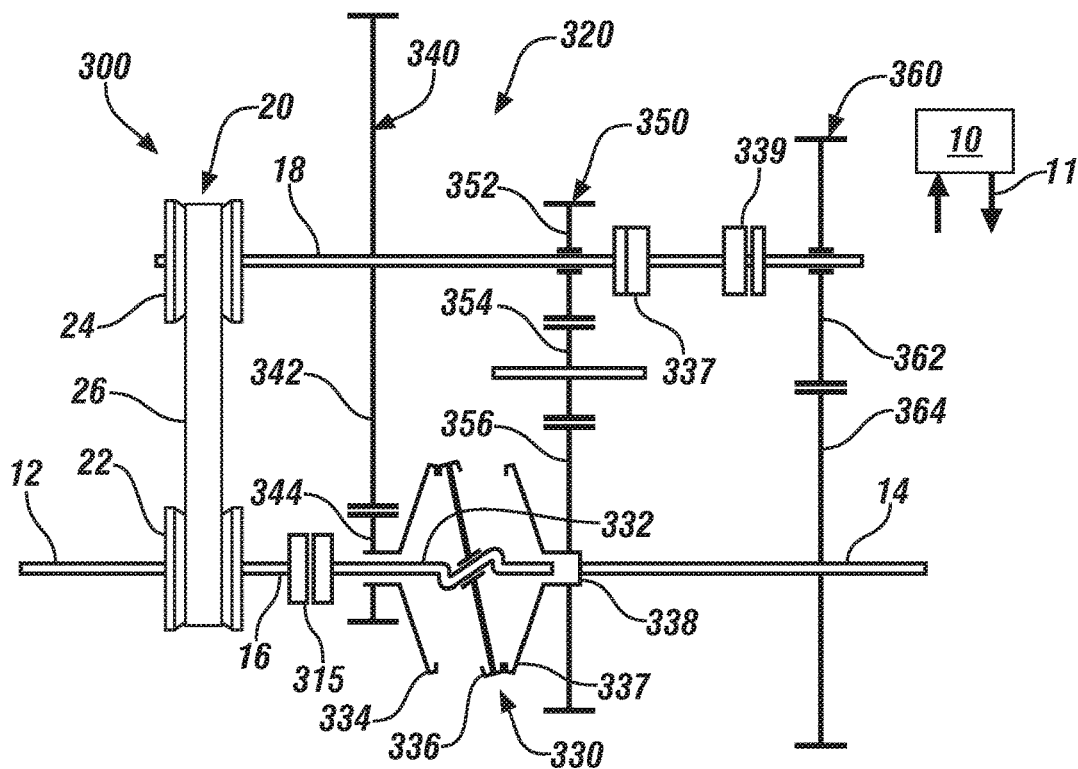
FIG. 3 schematically shows a third embodiment of a multi-mode transmission that includes the CVU arranged in parallel with a second expansion gearset that includes a pericyclic variable-speed power transmission (PVT) that is arranged in series with a second gearset, a third gearset and a fourth gearset between the transmission input member and the transmission output member, in accordance with the disclosure.

FIG. 3 schematically shows a third embodiment of a multi-mode transmission 300 that includes the CVU 20 arranged in parallel with a second expansion gearset 320 that includes a pericyclic variable-speed power transmission (PVT) 330 that is arranged in series with a second gearset 340, a third gearset 350 and a fourth gearset 360 between the transmission input member 12 and the transmission output member 14. The CVU 20 includes the first pulley 22 that is rotatably coupled to the second pulley 24 via the continuous flexible member 26. The first pulley 22 is rotatably coupled to the transmission input member 12 and the CVT input member 16, and the second pulley 24 is rotatable coupled to the CVT output member 18. The PVT 330 includes a PVT input member 332, a reaction control rotor (RCR) 334, a pericyclic motion converter (PMC) 336, a PVT output rotor 337 and a PVT output member 338, all of which are rotatingly engaged. The second gearset 340 includes a first gear 342 that is meshingly engaged to a second gear 344, wherein the first gear 342 is rotatably coupled to the CVT output member 18 and the second gear 344 is meshingly engaged to the RCR 334 of the PVT 330. The third gearset 350 is preferably a layshaft gearset that includes a third gear 352, a layset gear 354, and a fourth gear 356 that are meshingly engaged. The fourth gearset 360 includes a fifth gear 362 that is meshingly engaged to a sixth gear 364, and the sixth gear 364 is rotatably coupled to the transmission output member 14. The transmission output member 14 is also rotatably coupled to the PVT output member 338.

A plurality of clutches, including clutch C1 315, clutch SN1 337 and clutch SN2 339 are arranged to selectively engage various rotating members that are coupled to elements of the second expansion gearset 320 and the CVU 20 to effect transmission operation in one of a plurality of transmission range states including Park, Reverse, Neutral and Drive in response to commands from the controller 10, as described with reference to Table 3. The aforementioned clutches may also be nominally referred to as follows: first clutch C1 315, second clutch SN1 337 and third clutch SN2 339.

In one embodiment, clutches SN1 337 and SN2 339 are dog clutches that include meshing elements that selectively engage to effect rotation and torque transfer. Alternatively, either or both of the clutches SN1 337 and SN2 339 may be selectable one-way clutches or other clutch devices that mate meshable elements. Preferably, clutches SN1 337 and SN2 339 are not friction clutches so as to minimize space requirements and control complexity. In one embodiment, clutch C1 315 may be a friction clutch, or alternatively, another suitable clutch configuration.

The PMC 336 of the PVT 330 may be described as a wobbling member or nutator that effects a gear reduction and associated speed increase. The PVT input member 332 is rotatable about an input axis and the PVT output member 338 is rotatable about an output axis. The RCR 334 may include integrated motor/generator components for selective rotation about the input axis, and the PMC 336 is disposed to provide pericyclic motion about the input axis. The CVU 20 is controlled to selectively adjust the rate of rotation of the RCR 334 relative to the PVT input member 332. A bevel gear construction is a preferred embodiment of the transmission.

Input power from a prime mover may be transferred to the PMC 336 such that the load transfer components simultaneously engage with the conjugate members of the RCR 334 and the PVT output rotor 337. In one embodiment, the PVT 330 is configured as a fixed high-ratio transmission, with the reduction ratio being a function of the design features of the RCR 334, the PMC 336 and the PVT output rotor 337. The PVT 330 becomes an infinitely variable high ratio transmission when the RCR 334, under computer control, undergoes controlled rotation. This permits the PMC 336 to undergo simultaneous oscillation, nutation, rotation and differential circular pitch (stepless) indexing as part of transferring variable torque/rotational speed to the PVT output rotor 337 while traversing a higher order mathematical/spherical path of action. PVTs are known to those skilled in the art, and not described in further detail.

The arrangement of the CVU 20, PVT 330, second gearset 340, third gearset 350 and the fourth gearset 360 is as follows in this embodiment. The CVT output member 18 is rotatably coupled to the first gear 342 of the second gearset 340, is rotatably couplable to the third gear 352 of the third gearset 350 via activation of clutch SN1 337, and is rotatably couplable to the fifth gear 362 of the fourth gearset 360 via activation of clutch SN2 339. The CVT input member 16 is rotatably couplable to the PVT input member 332 via activation of clutch C1 315. The fourth gear 356 of the third gearset 350 is rotatably coupled to the PVT output member 338, and the sixth gear 364 of the fourth gearset 360 is rotatably coupled to the transmission output member 14. Gear ratios of the elements of the second gearset 340, the PVT 330, the third gearset 350 and the fourth gearset 360 may be selected during development, and are based upon device and application-specific criteria.

Clutch activation to effect operation in various transmission range states including Park, Reverse, Neutral, Drive-CVT mode and Drive-PVT mode, is shown with reference to Table 3, below, wherein clutch activation is indicated by 'X'.

TABLE 3

| Range State | C1 | SN1 | SN2 |
|---|---|---|---|
| Park |  |  | X |
| Reverse |  |  | X |
| Neutral |  | X |  |
| Drive—CVT Mode |  | X |  |
| Drive—PVT Mode | X |  |  |

Figure 4:
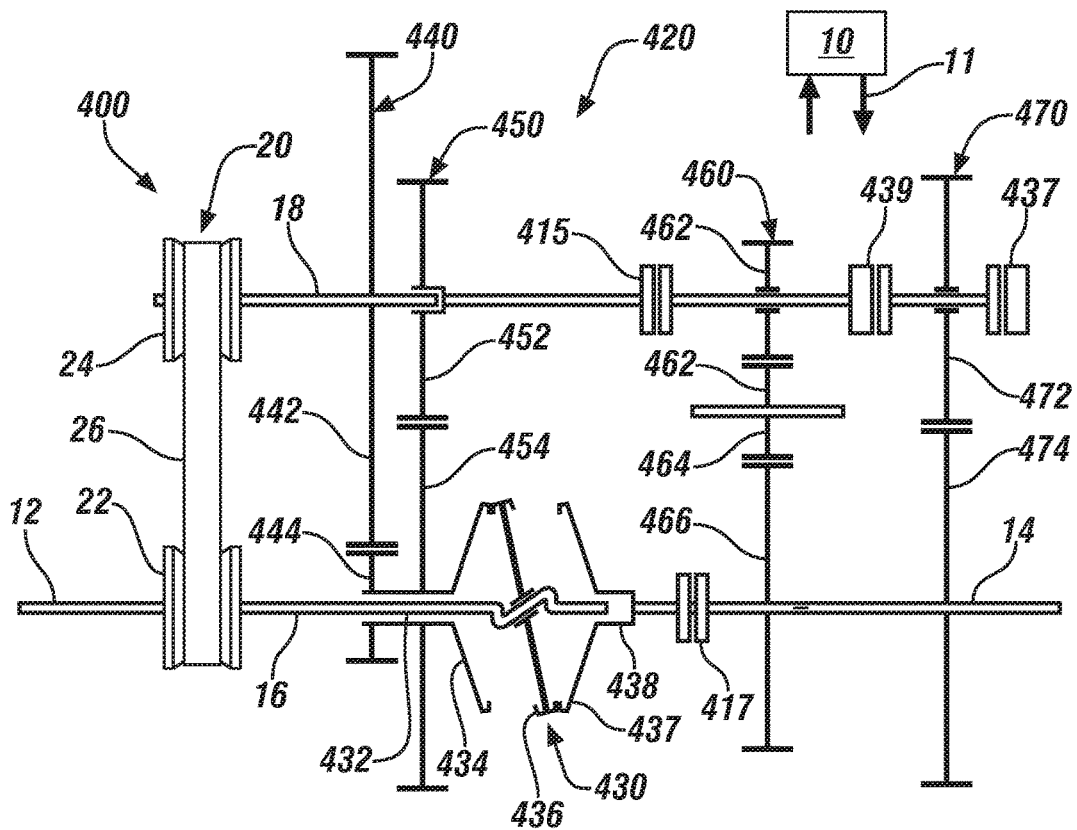
FIG. 4 schematically shows a fourth embodiment of a multi-mode transmission that includes the CVU arranged in parallel with a second expansion gearset that includes a PVT that is arranged in series with a second gearset, a third gearset, a fourth gearset and a fifth gearset between the transmission input member and the transmission output member, in accordance with the disclosure.

FIG. 4 schematically shows a fourth embodiment of a multi-mode transmission 400 that includes the CVU 20 arranged in parallel with a second expansion gearset 420 that includes a pericyclic variable-speed power transmission (PVT) 430 that is arranged in series with a second gearset 440, a third gearset 450, a fourth gearset 460 and a fifth gearset 470 between the transmission input member 12 and the transmission output member 14. The CVU 20 includes the first pulley 22 that is rotatably coupled to the second pulley 24 via the continuous flexible member 26. The first pulley 22 is rotatably coupled to the transmission input member 12 and the CVT input member 16, which is rotatably coupled to a PVT input member 432, and the second pulley 24 is rotatable coupled to the CVT output member 18. The PVT 430 includes the PVT input member 432, a reaction control rotor (RCR) 434, a pericyclic motion converter (PMC) 436 and a PVT output member 438, all of which are rotatingly engaged. The second gearset 440 includes a first gear 442 that is meshingly engaged to a second gear 444, wherein the first gear 442 is rotatably coupled to the CVT output member 18 and the second gear 444 is meshingly engaged to the RCR 434 of the PVT 430. The third gearset 450 preferably includes a third gear 452 and a fourth gear 454 that are meshingly engaged. The fourth gearset 460 is a layshaft gearset that includes a fifth gear 462 that is meshingly engaged to a layshaft gear 464 that is meshingly engaged to a sixth gear 466, and the sixth gear 466 is rotatably coupled to the transmission output member 14. The fifth gearset 470 includes a seventh gear 472 that is meshingly engaged to an eighth gear 474, and the eighth gear 474 is rotatably coupled to the transmission output member 14.

A plurality of clutches, including clutch C1 415, C2 417, clutch SN1 437 and clutch SN2 439 are arranged to selectively engage various rotating members that are coupled to elements of the second expansion gearset 420 and the CVU 20 to effect transmission operation in one of a plurality of transmission range states including Park, Reverse, Neutral and Drive in response to commands from the controller 10, as described with reference to Table 4.

In one embodiment, clutches SN1 437 and SN2 439 are dog clutches that include meshing elements that selectively engage to effect rotation and torque transfer. Alternatively, either or both of the clutches SN1 437 and SN2 439 may be selectable one-way clutches, or other clutch devices that mate meshable elements. Preferably, clutches SN1 437 and SN2 439 are not friction clutches so as to minimize space requirements and control complexity. In one embodiment, clutches C1 415 and C2 417 may be friction clutches, or alternatively, other suitable clutch configurations. The aforementioned clutches may also be nominally referred to as follows: first clutch C1 415, second clutch C2 417, third clutch SN1 437 and fourth clutch SN2 439.

The arrangement of the CVU 20, PVT 430, second gearset 440, third gearset 450, fourth gearset 460 and the fifth gearset 470 is as follows in this embodiment. The CVT output member 18 is rotatably coupled to the first gear 442 of the second gearset 440, and the CVT input member 16 is rotatably coupled to the PVT input member 432. The third gear 452 of the third gearset 450 is rotatably couplable to the fifth gear 462 of the fourth gearset 460 via activation of clutch C1 415 and clutch SN2 439, and is rotatably couplable to the seventh gear 472 of the fifth gearset 470 via activation of clutch C1 415 and clutch SN1 437. The fourth gear 454 of the third gearset 450 is rotatably coupled to the RCR 434 of the PVT 430. The PVT output member 438 is rotatably couplable to the transmission output member 14 by activation of the clutch C2 417. Gear ratios of the elements of the second gearset 440, the PVT 430, the third gearset 450 and the fourth gearset 460 may be selected during development, and are based upon device and application-specific criteria.

Clutch activation to effect operation in various transmission range states including Park, Reverse, Neutral, Drive-CVT mode and Drive-PVT mode, is shown with reference to Table 4, below, wherein clutch activation is indicated by 'X'.

TABLE 4

| Range State | C1 | C2 | SN1 | SN2 |
|---|---|---|---|---|
| Park |  |  | X |  |
| Reverse | X |  | X |  |
| Neutral | X |  |  |  |
| Drive—CVT Mode | X |  |  | X |
| Drive—PVT Mode |  | X |  |  |

In each embodiment, the controller 10 monitors operation and controls various actuators to effect operation of the corresponding transmission 100, 200, 300 and 400 through the CVU 20 through activation of one or more of the associated clutches. This includes monitoring sensor inputs and executing control routines to determine control parameters for actuators to control operation of various powertrain elements. Driver input devices such as an accelerator pedal and associated accelerator pedal position sensor can be monitored to determine an operator torque request. Various sensors are suitably positioned for sensing and providing signals, including, e.g., an input speed sensor monitoring rotation of the transmission input member 12, variator speed sensor(s) monitoring the CVU 20 and an output speed sensor monitoring rotation of the transmission output member 14. The input speed sensor and output speed sensor may be any suitable rotation position/speed sensing device, such as a Hall-effect sensor. The controller 10 may include digital processing capability that issues control signals based on input signals such as vehicle speed and engine torque. The controller 10 is shown as a single device for ease of illustration. Those skilled in the art appreciate that the controller 10 may be a unitary controller or a plurality of controllers that are disposed to control operation of various elements of the powertrain system. By way of non-limiting examples, there may be one or multiple controllers that are arranged to monitor and control operation of the prime mover, and one or multiple controllers that are arranged to monitor and control operation of the transmission 100, 200, 300, 400.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired point-to-point link, a networked communication bus link, a wireless link or any other suitable communication link, shown as element 11. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A torque transmission device for transferring mechanical power between a transmission input member and a transmission output member, comprising:
    a continuously variable unit (CVU) arranged in parallel with an expansion gearset;
    the CVU including a first pulley that is rotatably coupled to a second pulley, wherein the first pulley is rotatably coupled to the transmission input member;
    the expansion gearset including a planetary gearset that is arranged in series with a coplanar second gearset;
    the second gearset including a first gear meshingly engaged with a layshaft gear;
    the second pulley rotatably coupled to the first gear of the second gearset;
    wherein the planetary gearset includes a sun gear meshingly engaged with planet gears and a carrier member meshingly engaged with a ring gear;
    wherein the layshaft gear is meshingly engaged with the ring gear;
    wherein the carrier member of the planetary gearset is rotatably couplable to the transmission output member;
    wherein the first pulley is rotatably couplable to the sun gear via activation of a first clutch;
    wherein the torque transmission device operates in a continuously variable mode to transfer power between the transmission input member and the transmission output member when the first clutch is deactivated;
    wherein the torque transmission device operates in a power split mode to transfer power between the transmission input member and the transmission output member when the first clutch is activated; and
    wherein the carrier member of the planetary gearset is rotatably couplable to the transmission output member via activation of a second clutch.

2. The torque transmission device of claim 1, further comprising the second pulley rotatably couplable to the first gear of the second gearset via activation of a third clutch.

3. The torque transmission device of claim 1, further comprising the carrier member of the planetary gearset rotatably couplable to a transmission ground via activation of a first brake, wherein the transmission is operative in a reverse mode when the first brake is activated.

4. The torque transmission device of claim 1, wherein the second pulley is rotatably couplable to the first gear of the second gearset via activation of a third clutch.

5. The torque transmission device of claim 4, wherein the third clutch comprises a dog clutch.

6. The torque transmission device of claim 1, wherein the CVU includes the first pulley rotatably coupled to the second pulley via a continuous flexible chain.

7. The torque transmission device of claim 1, wherein the CVU arranged in parallel with the expansion gearset including the planetary gearset that is arranged in series with the coplanar second gearset is configured to effect operation in one of a plurality of transmission range states including Park, Reverse, Neutral and Drive.

8. The torque transmission device of claim 1, wherein the CVU is operative at a first speed ratio spread, and wherein the CVU arranged in parallel with the expansion gearset including the planetary gearset that is arranged in series with the coplanar second gearset is operative at a second speed ratio spread that is greater than the first speed ratio spread.

9. A torque transmission device for transferring mechanical power between a transmission input member and a transmission output member, comprising:
    a continuously variable unit (CVU) arranged in parallel with an expansion gearset and a third gearset;
    the CVU including a first pulley that is rotatably coupled to a second pulley, wherein the first pulley is rotatably coupled to the transmission input member;
    the expansion gearset including a planetary gearset that is arranged in series with a coplanar second gearset;
    the second gearset including a first gear meshingly engaged with a layshaft gear;
    the third gearset including a third gear meshingly engaged with a fourth gear;
    wherein the planetary gearset includes a sun gear meshingly engaged with planet gears and a carrier member meshingly engaged with a ring gear;
    wherein the first pulley is rotatably couplable to the sun gear via a first clutch;
    wherein the ring gear is rotatably couplable to the carrier member via a second clutch;
    wherein the second pulley is rotatably couplable to the first gear of the second gearset via a third clutch;
    wherein the second pulley is rotatably couplable to the third gear via a fourth clutch;
    wherein the layshaft gear is meshingly engaged with the ring gear;
    wherein the carrier member of the planetary gearset is rotatably coupled to the transmission output member;
    wherein the torque transmission device operates in a continuously variable mode to transfer power between the transmission input member and the transmission output member when the first clutch is deactivated and the second and fourth clutches are activated; and
    wherein the torque transmission device operates in a power split mode to transfer power between the transmission input member and the transmission output member when the first and fourth clutches are activated.

10. The torque transmission device of claim 9, wherein the torque transmission device operates in a reverse direction when the second and third clutches are activated.

11. The torque transmission device of claim 9, wherein the CVU is operative at a first speed ratio spread, and wherein the CVU arranged in parallel with the expansion gearset including the planetary gearset that is arranged in series with the coplanar second gearset and in parallel with the third gearset is operative at a second speed ratio spread that is greater than the first speed ratio spread.

12. The torque transmission device of claim 9, wherein the first, second, third and fourth clutches comprise dog clutches.

13. A transmission device comprising a continuously variable unit (CVU) arranged in parallel with a pericyclic variable-speed power transmission (PVT) and a layshaft gearset to transfer mechanical power between a transmission input member and a transmission output member;
the CVU including a first pulley that is rotatably coupled to a second pulley, wherein the first pulley is rotatably coupled to the transmission input member;
the layshaft gearset including a first gear, a layshaft gear and a second gear;
the PVT including a PVT input member, a reaction control rotor, a pericyclic motion converter, a PVT output rotor and a PVT output member;
wherein the first pulley is rotatably couplable to the PVT input member;
wherein the second pulley is rotatably coupled to the reaction control rotor;
wherein the second pulley is rotatably couplable to the first gear of the layshaft gearset;
wherein the PVT output member is rotatably couplable to the second gear of the layshaft gearset and rotatably couplable to the transmission output member;
wherein the torque transmission device operates in a continuously variable mode to transfer power between the transmission input member and the transmission output member when the second pulley is rotatably coupled to the first gear of the layshaft gearset; and
wherein the torque transmission device operates in a pericyclic motion mode to transfer power between the transmission input member and the transmission output member when the PVT output member is rotatably coupled to the transmission output member.

14. The transmission of claim 13, wherein rotational speed of the reaction control rotor is controlled by a rotational speed of the second pulley of the CVU.

15. The transmission of claim 13, wherein the first pulley is rotatably couplable to the PVT input member via a clutch.

16. The transmission of claim 13, wherein the second pulley is rotatably couplable to the first gear of the layshaft gearset via a clutch.

17. The transmission of claim 13, wherein the clutch comprises a dog clutch.

18. The transmission of claim 13, wherein the CVU is operative at a first speed ratio spread, and wherein the CVU arranged in parallel with the expansion gearset including the planetary gearset that is arranged in series with the coplanar second gearset and in parallel with the third gearset is operative at a second speed ratio spread that is greater than the first speed ratio spread.

* * * * *